UNITED STATES PATENT OFFICE.

ARMAND MÜLLER-JACOBS, OF NEW YORK, N. Y., ASSIGNOR TO CATHARINA MÜLLER-JACOBS AND AUGUST LOOS, BOTH OF SAME PLACE.

COLORING COMPOUND.

SPECIFICATION forming part of Letters Patent No. 342,207, dated May 18, 1886.

Application filed February 1, 1886. Serial No. 190,522. (Specimens.)

*To all whom it may concern:*

Be it known that I, ARMAND MÜLLER-JACOBS, of the city, county, and State of New York, have invented certain new and useful Improvements in Coloring-Matters, of which the following is a specification.

This invention relates to the manufacture of coloring compositions in powder form and soluble in benzine, ether, turpentine, and oils; and the invention consists of a coloring composition composed of the resinate of a metal or alkaline earth and a soluble color or dye.

In carrying out my invention the resinate is first prepared in the following manner: A sufficient quantity of a caustic alkali is dissolved and mixed at boiling heat with as much colophony or other resins as the same can absorb, whereby a resinate of the alkali is produced. This resinate is mixed up to the saturation-point with sulphate of zinc or aluminium or any other salt of a metal or alkaline earth, and the resulting precipitate washed out and dried. The precipitate is a fine powder consisting of resinate of zinc, aluminium, or other metal or alkaline earth whichever has been employed. These resinates have the property of uniting themselves with any coloring matter or dye soluble in water or alcohol—such as aniline colors, azo colors, and other colors obtained from coal-tar—and also with vegetable dyes and wood extracts. The coloring compositions thus produced by the combination of the resinates of metals or alkaline earths with soluble coloring matters and dyes are reduced to powder form by evaporation. They possess considerable body and have the characteristic of being insoluble in water or alcohol, but soluble in benzine, ether, turpentine, oils, &c., which has not been possible with these colors or dyes heretofore. They possess a brilliant lustre and can be applied to many purposes in the arts—such as for printing on textile fabrics and wall-papers, for varnishes, for lithographic colors, &c. As many different colors and tints can thus be produced as there are different shades of colors and dyes, said colors or dyes uniting in all cases with the resinates of the metals or alkaline earths, which latter form the vehicles by which they are made soluble in benzine and other solvents mentioned.

I do not claim in this application the method of making this coloring composition, as I have claimed the same in the application filed March 5, 1886, Serial No. 194,128.

Having thus described my invention, I claim as new and desire to secure by Letters Patent—

A coloring composition insoluble in water or alcohol and soluble in benzine and similar solvents, composed of the resinate of a metal or alkaline earth and a coloring matter or dye soluble in water or alcohol before compounding, substantially as set forth.

In testimony that I claim the foregoing as my invention I have signed my name in presence of two subscribing witnesses.

ARMAND MÜLLER-JACOBS.

Witnesses:
PAUL GOEPEL,
MARTIN PETRY.